United States Patent [19]
Dickinson et al.

[11] Patent Number: 5,688,406
[45] Date of Patent: Nov. 18, 1997

[54] METHOD AND APPARATUS FOR SEPARATING PARTICULATE FROM A FLOWING FLUID

[75] Inventors: Stuart C. Dickinson, Bristol; Robert Kuklinski, Portsmouth, both of R.I.

[73] Assignee: The United States of America as represented by the Secretary of the Navy, Washington, D.C.

[21] Appl. No.: 613,772

[22] Filed: Feb. 28, 1996

[51] Int. Cl.$^6$ .................................................. C02F 1/36
[52] U.S. Cl. .................. 210/748; 210/170; 366/127; 367/131
[58] Field of Search .................. 210/748, 243, 210/747, 170; 367/131; 366/127; 406/198

[56] References Cited

U.S. PATENT DOCUMENTS

| | | | |
|---|---|---|---|
| Re. 33,524 | 1/1991 | Schram | 210/748 |
| 2,766,881 | 10/1956 | Westervelt et al. | 210/748 |
| 2,907,455 | 10/1959 | Sasaki | 210/748 |
| 3,109,721 | 11/1963 | Zenner et al. | 210/748 |
| 3,463,321 | 8/1969 | Van Ingen | 210/748 |
| 3,650,094 | 3/1972 | Goodwin | 55/277 |
| 4,280,823 | 7/1981 | Szonntagh | 210/748 |
| 4,556,467 | 12/1985 | Kuhn et al. | 210/748 |
| 4,673,512 | 6/1987 | Schram | 210/748 |
| 4,941,135 | 7/1990 | Schram | 367/150 |
| 5,006,266 | 4/1991 | Schram | 210/748 |
| 5,085,783 | 2/1992 | Feke et al. | 210/748 |
| 5,192,450 | 3/1993 | Heyman | 210/748 |
| 5,395,592 | 3/1995 | Bolleman et al. | 422/128 |
| 5,459,699 | 10/1995 | Walter | 367/142 |

*Primary Examiner*—Cynthia L. Nessler
*Attorney, Agent, or Firm*—Michael J. McGowan; James M. Kasischke; Prithvi C. Lall

[57] ABSTRACT

Apparatus and methods for filtering particulate matter from a fluid traveling proximate a surface containing a port. First and second ultrasonic wave generators produce superposed ultrasonic waves to define a composite wave pattern in a region of the fluid body upstream of the port. Nodes and antinodes in the composite wave region define regions at which the particulate matter accumulates. The accumulating particulate matter is displaced out of the fluid that enters the port.

16 Claims, 6 Drawing Sheets

METHOD AND APPARATUS FOR SEPARATING PARTICULATE FROM A FLOWING FLUID

STATEMENT OF GOVERNMENT INTEREST

The invention described herein may be manufactured and used by or for the Government of the United States of America for governmental purposes without the payment of any royalties thereon or therefor.

CROSS REFERENCES TO RELATED PATENT APPLICATION

The instant application is related to U.S. Patent Application Ser. No. 08/613,771, filed Feb. 28, 1996 entitled "METHOD AND APPARATUS FOR SEPARATING SUSPENDED PARTICLES FROM A FLUID".

BACKGROUND OF THE INVENTION

(1) Field of the Invention

This invention relates generally to the displacement of particles suspended within a fluid and more particularly to selective displacement of particles within a flowing fluid by the generation of acoustic waves.

(2) Description of the Prior Art

Filtration of particulate matter from fluids drawn into a port located on a surface within a body of fluid has generally been accomplished by placing a filtering screen or grate over the port. Such filtering of the fluid, however, causes a pressure drop across the port. Additionally, the matter filtered by the filtering screen tends to accumulate on the filtering screen eventually clogging the port. Periodic cleaning of the filtering screen can be inconvenient.

It is also known that generation of acoustic waves in a fluid having particulate matter dispersed therein can separate particulate matter from various fluids. The state of the art for acoustic wave separation devices and methods to isolate particulate matter within a fluid are generally represented by the following:

U.S. Pat. No. 4,759,775 to Peterson et al. discloses a method and apparatus for controlling the movement of particles having different physical properties when one of the materials is a fluid. The method and apparatus works by propagating first and second acoustic waves through a vessel containing the materials with the frequency of the waves being different so that the two acoustic waves are superimposed upon each other. The superposition of the two waves creates a beat frequency wave with pressure gradients dividing the vessel into moving regions of maximum and minimum pressure. Selective control of the frequency differences in the two waves can then be used to position one of the two materials to a selected aggregating location within the vessel.

U.S. Pat. No. 4,877,516 to Schram discloses a method for manipulating particulate matter by generating an acoustic standing wave with nodal planes of varying energy density in a fluid medium. Particles in the fluid medium responsive to the acoustic energy of the standing wave accumulate at these nodal planes so that in conjunction with the fluid viscous force and field forces acting in the direction of the nodal planes, movement of particles held at these planes can be controlled. The attenuation of the acoustic beams producing the standing wave do not adversely affect the action of this method due to the imbalance of the acoustic forces that tend to be perpendicular to the movement of the particles in the nodal wave direction.

U.S. Pat. No. 5,006,266 to Schram discloses apparatus for generating two standing waves along transverse axes in a column of water so that the node to the standing waves intersect within the column. The nodes cause relative displacement between the particles in the liquid in a direction transverse to the axis of the standing waves.

U.S. Pat. No. 5,225,089 to Benes et al. discloses a method and apparatus for separating particles which are dispersed in a medium by generating an ultrasonic standing wave. Specifically a composite resonator and a reflector are disposed in or along the walls of a vessel with the dispersion medium therebetween. The resonator generates a characteristic frequency wave with an amplitude slightly smaller than an upper threshold amplitude toward the reflector to generate standing wave. The pressure forces extended by the standing wave pattern on the particles accumulated at the nodes and antinodes are equivalent to longitudinal holding forced on the particles. Thus the particulates tend to congregate and remain at nodes and antinodes of the standing wave.

Generally the foregoing prior art references fail to disclose a method and apparatus for separating particulate matter in a fluid body from those selected portions of the fluid that enter a port. Particularly, they fail to teach a method and apparatus for enabling relatively large amounts of fluid to be drawn from substantially an infinite reservoir of such fluid. That is, the methods and apparatus for filtering that include generating sonic waves are limited to relatively confined fluid bodies, e.g., sludge ponds, enclosed containers, or between the walls of a conduit. While the prior art directed fluid from large bodies of fluids (e.g., covering the intake port with a mesh grate or screen filter) enables filtration of fluid entering such ports, these methods and filters suffer from the disadvantage of requiring periodic cleaning and of operating with a pressure drop across the filter.

SUMMARY OF THE INVENTION

An object of this invention is to provide a method and apparatus for moving particles suspended in a flowing fluid without affecting the flow characteristics of the fluid.

Another object of this invention is to provide a method and apparatus for separating particles suspended in a flowing fluid from a portion of the fluid.

Yet another object of this invention is to provide a method and apparatus for diverting fluid from which particles have been separated into a conduit as a source of substantially particle free fluid within the conduit.

Still another object of this invention is to provide a method and apparatus for moving particulate matter from a flowing fluid without requiring filters or other devices subject to clogging.

Yet still another object of this invention is to provide a method and apparatus for filtering particulate matter entering a port form a large body of flowing fluid without a substantial pressure drop across the port.

A further object of this invention is to provide apparatus for delivering a flow of relatively clear water to a surface vessel or an undersea vehicle travelling in water having particulate matter suspended therein.

According to this invention apparatus for separating particulate matter from flowing fluid that enters a port includes first and second ultrasonic wave generators that produce superposed ultrasonic wave patterns in a region of the fluid body upstream of an inlet port. A resulting composite wave transports particulate matter away from the fluid flowing into the port and into fluid that bypasses the port whereby the fluid entering the port is relatively free from particulate matter.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENTS

Figure 1:
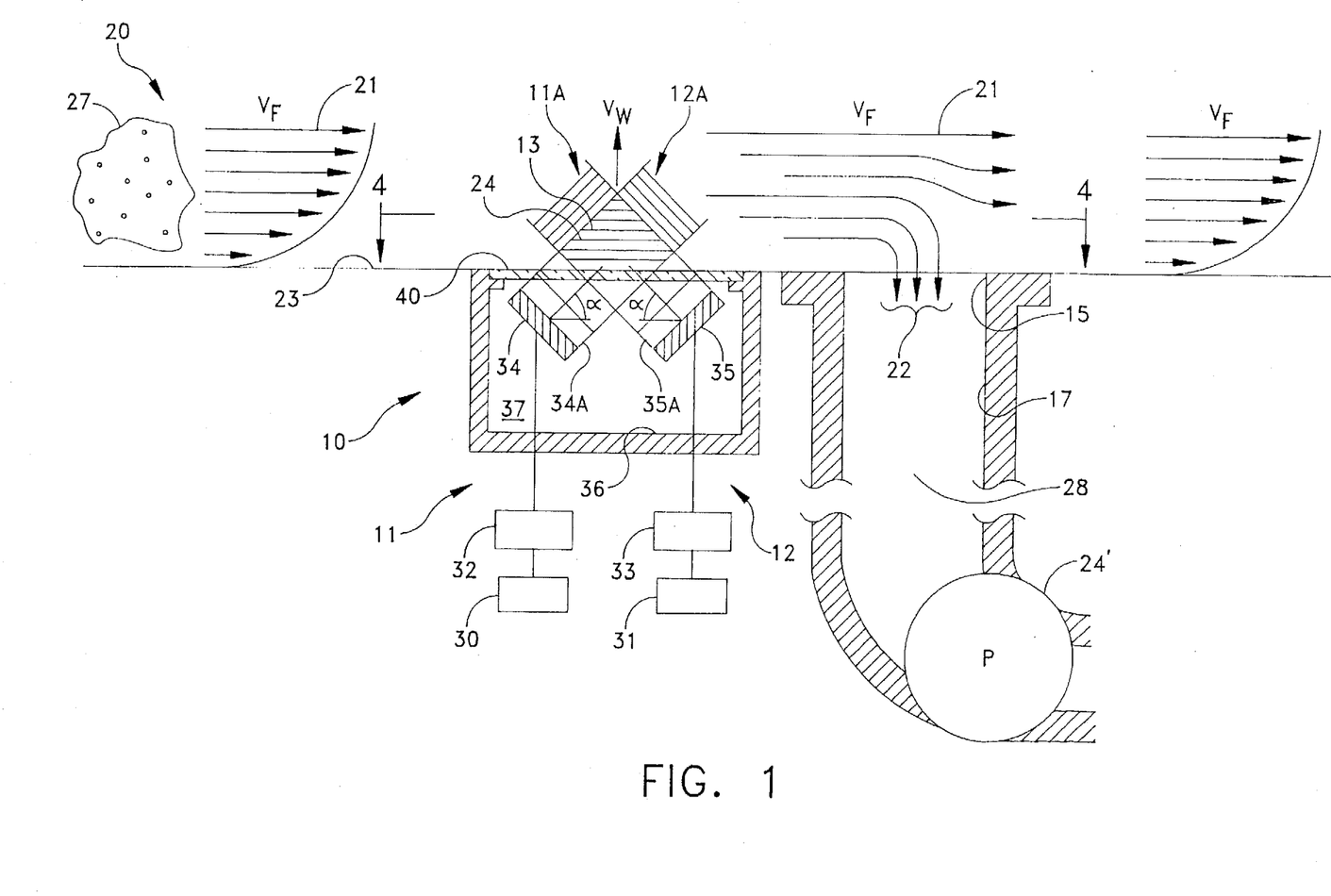
FIG. 1 a plan view in partial cross-section of a filtering apparatus according to the invention.

A filtering apparatus 10 in FIG. 1 according to this invention includes first and second ultrasonic wave generators 11 and 12 for generating first and second ultrasonic wave patterns 11A and 12A, respectively, of a first and second frequency that superpose in a region 13 of a flowing fluid body 14. The region 13 is disposed upstream of a port 15 connecting a conduit 17. Upstream stream lines 20 represent fluid flow upstream of the port 15. A downstream flow line 21 is a first stream line that represents a flow boundary between fluid that bypasses the port 15 and fluid that enters the port 15. Downstream stream lines 22 represent a first fluid flow portion flowing into the conduit 17 through the port 15. The stream lines above the stream line 21 corresponding to a second fluid flow portion move generally at a velocity $V_F$. The fluid below the stream line 21 moves progressively slower as it approaches a surface 23. Those skilled in the art will appreciate that these conditions are the same whether the fluid body 14 actually moves with respect to the surface 23 (e.g., a river relative to the riverbed) or the surface 23 actually moves with respect to the fluid body 14 (e.g., the hull of a ship moving through the fluid body). Frequently, a pump 24' or other such mechanism may be connected in a suitable manner with the conduit 17 to increase the rate of flow of the fluid into the conduit 17 (i.e., to draw fluid from the fluid body 14 into the conduit 17).

The ultrasonic waves 11A and 12A generated by the first and second ultrasonic wave generators 11 and 12 define a composite wave pattern 24 in the region 13. The composite wave pattern 24 includes nodes 25 and antinodes 26. The nodes 25 and antinodes 26 extend in planes in the region 13 that, in this embodiment, are generally parallel with the flow of the fluid body 14. In this embodiment the frequencies of the first and second wave patterns are slightly different so that the composite wave pattern resembles a standing wave except that the nodes 25 and antinodes 26 move at a velocity $V_w$ through the region 13. The composite wave pattern 24 formed by superposing the wave patterns 11A and 12A of such differential frequencies is often called a beat wave or pseudo-standing wave.

Figures 2, 3:
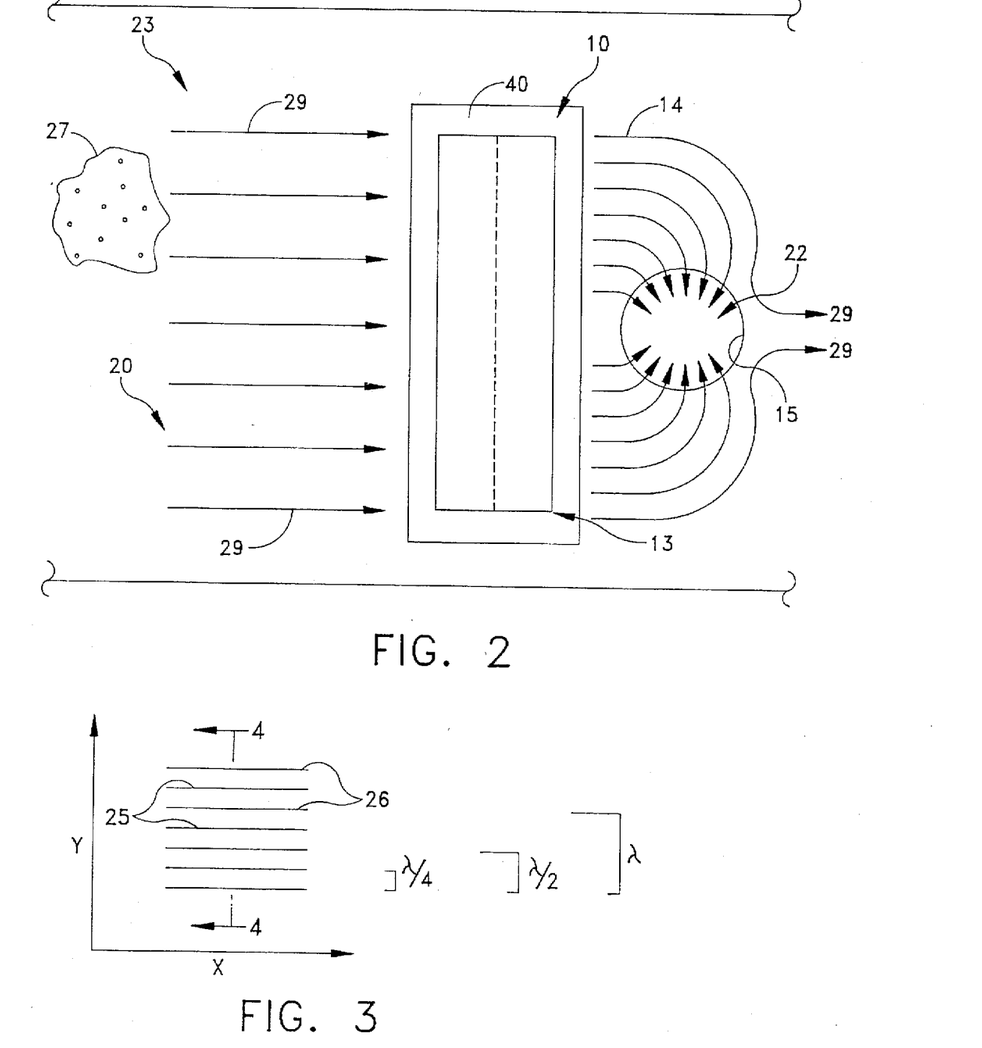
FIG. 2 is a top view of the embodiment of FIG. 1.
FIG. 3 is a diagram graphically illustrating a superposed composite wave pattern generated by the embodiment of FIG. 1.
Figure 4:
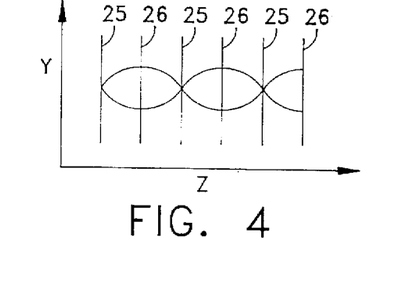
FIG. 4 is a view of the diagram of FIG. 3 taken along the lines 4—4.

Particulate matter entrained in the fluid located in the region 13 that includes the first fluid flow portion represented by lines 22 tends to accumulate along such nodal and antinodal planes which are minima and maxima pressure gradients (see FIGS. 3 and 4). More specifically, particulate matter in the fluid body 14, such as depicted in a cloud 27, will, upon entering the region 13 and depending upon the characteristics of the particulate matter, accumulate along ones of the planes defined by the moving nodes 25 and antinodes 26. Thus, as the nodes 25 and antinodes 26 move away from the surface 23 at a velocity $V_w$, the particulate matter accumulating along the nodes 25 and antinodes 26 tends to be transported in the same direction and at the same rate (i.e., at a speed $V_w$).

If the region 13 has a sufficient width dimension in the direction of the velocity $V_F$ and a sufficient height above the surface 23, particulate matter entering the region 13 will accumulate along the nodes 25 and antinodes 26 and will be transported to a location beyond the stream line 21 before the fluid between the stream line 21 reaches the port 15. Additionally, the region 13 should also be formed sufficiently long in the transverse direction to include, as depicted in FIG. 2, the stream lines 29, which, although diverted, are not drawn into the port 15. In this manner particulate matter accumulating along the nodes 25 and antinodes 26 will be separated from the fluid entering the port 15, so that only filtered fluid that is substantially free of particulate matter will enter the port 15.

The velocity $V_w$ of the nodes 25 and antinodes 26 of the composite wave pattern is a function of wave spacing of the composite wave pattern, which in turn is a function of the wavelength and angle of incidence of the wave patterns 11A and 12A and the difference in the frequency of such wave patterns. Specifically:

$$V_w = \frac{\lambda}{2\sin\alpha} (f_1 - f_2) \quad (1)$$

where:

$f_1$ is the frequency of the wave pattern produced by signal generator 11

$f_2$ is the frequency of the wave pattern produced by signal generator 12

$\lambda$ is the wavelength of the signals $\alpha$ is the tilt angle of each transducer The force produced by each of the nodes and antinodes of the composite wave upon a particle entering the region is given approximately by the equation:

$$F = \pi R^2 (KR) \rho V_0^2 \left( \frac{\rho_b + \frac{2}{3}(\rho_b - \rho)}{2\rho_b + \rho} - \frac{c^2 \rho}{3c_b^2 \rho_b} \right) \quad (2)$$

Where:

R=the radius of the particle

K=is the wave number of the composite wave (2 $\pi/\lambda$)

$V_o$=is the fluid's velocity amplitude which is a function of the energy of the composite wave $\rho$=fluid density $\rho_b$=particle density c=speed of sound in the fluid $c_b$=speed of sound in the particle material Assume, for example, that the apparatus 10 of FIG. 1 is disposed in a shipboard hull 23 moving at a velocity $V_F$ equal to 15 knots (approximately 25 feet./sec.) in the fluid body 14 that includes particulate matter in the 25–400 micron range, (e.g., a muddy river, a lake or the ocean with disturbed bottom silt or the like). To filter this particulate matter the ultrasonic generators 11 and 12 would produce signals in the 1 MHz range with a frequency shift or difference ($f_1-f_2$) of 2875 Hz. For optimal wave spacing, the transducers are tilted at 45° with respect to the surface.

At a nominal 1 MHz operating frequency, the wavelength $\lambda$ is approximately 4750 microns. The waves have an incidence angle of 90° as shown in FIG. 1, the velocity $V_w$ of the nodes and antinodes within the region 13 would be approximately 10 feet/sec or 3 m/sec. The wave length of the composite wave would be approximately 4242 microns with the spacing between adjacent nodes and antinodes being approximately 1060 microns.

Assuming the height of the stream line 21 is five feet above the surface 23, the region 13 in which the composite wave pattern exists would have to be large enough to include a diagonal line 13A extending 12.5 feet at an angle B of 23.5° at the point 13B on the surface 23 where the upstream portion of the region 13 contacts the surface 40. Length of diagonal line 13A is calculated so that all particulate matter of the size filtered by the apparatus 10 that enters the region 13 would be transported above the stream line 21 and thus separated from the fluid entering the port 15. In practice, the diagonal line 13A could actually be smaller, as the flow rate of the fluid below the stream line 21 typically will be less than 25 feet/sec and will approach zero only closely adjacent the surface 23.

Continuing to refer to FIG. 1, in one specific embodiment the first and the second ultrasonic generators 11 and 12 include frequency sources 30 and 31 and amplifiers 32 and 33 that drive transducers 34 and 35, respectively. A chamber 36 filled with an appropriate sound transmitting medium 37, such as oil or foam, carries the transducers 34 and 35. An upper cover 40 made of a acoustically transparent material defines the interface between the fluid body 14 and the chamber 36. Acoustic lenses 34A and 35A can be positioned at transducers 34 and 35 to focus the emitted acoustic radiation.

The composite wave pattern form in the region 13 of FIG. 1, as previously indicated, extends transversely from the surface 40 through the first fluid flow portion and includes a series of nodes 25 and antinodes 26 that are each separated by ¼ the wave length of the composite wave pattern (i.e., the fringe spacing which in the previously described example is approximately 1060 microns), as illustrated in FIGS. 3 and 4. Also as previously described, each of the nodes 25 corresponds to a minimum pressure in the composite wave pattern, and each of the antinodes 26 corresponds to a maximum pressure in the composite wave pattern. Particulate matter in the region 13 will tend to accumulate along these gradients depending upon their characteristics (e.g., particulate matter of both low density and size, for example, tend to accumulate along the antinodes 26 while particulate matter with higher density and size tend to accumulate at the nodes 25). The velocity $V_w$ of these pressures tend to transport such accumulating particulate matter in the same direction at the same rate and hence into the second fluid flow portion to be transported downstream from the port.

Figure 5:
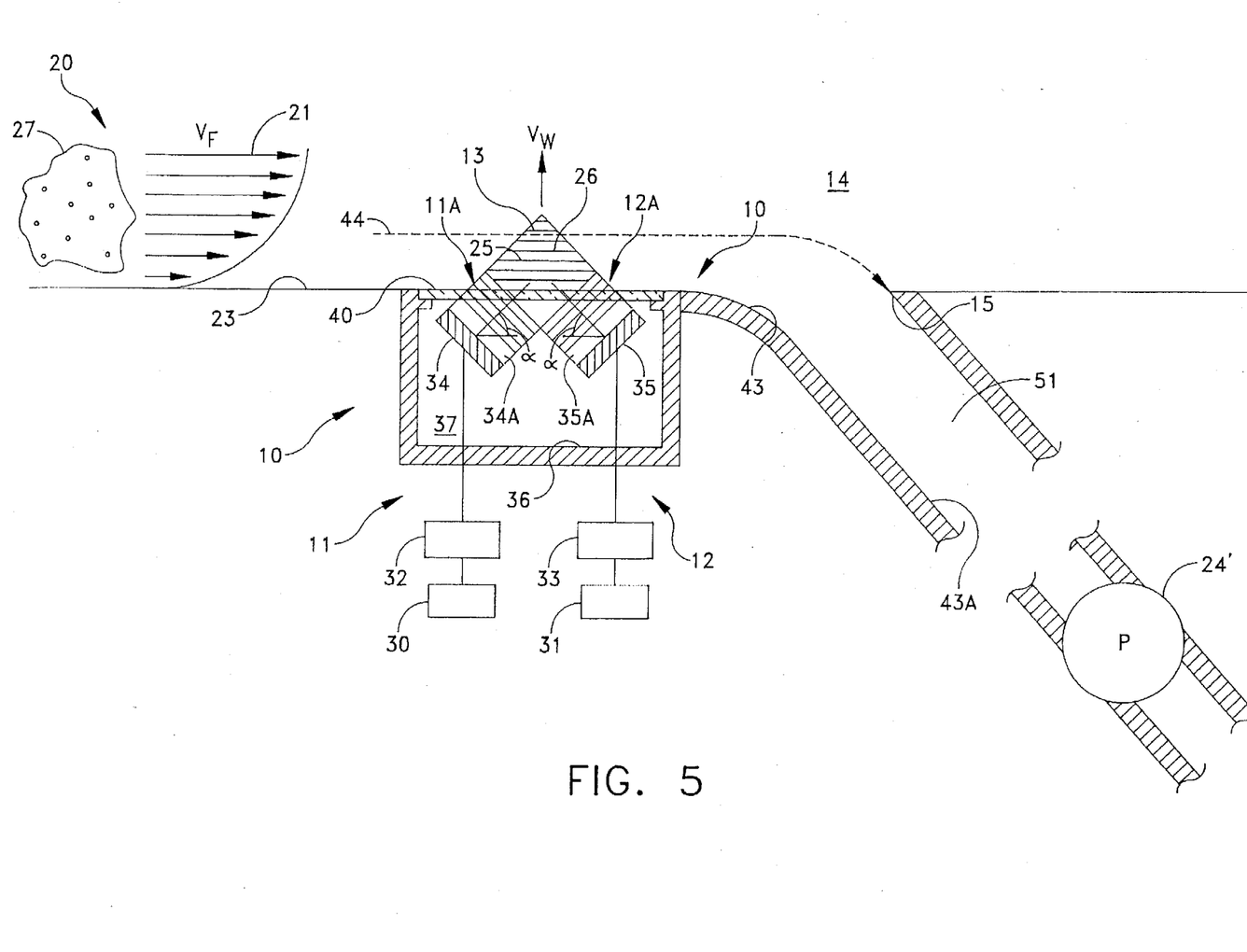
FIG. 5 is a plan view of another embodiment of this invention.

In an embodiment disclosed in FIG. 5 the apparatus 10 is positioned upstream of a streamlined port 43. Stream lines above a stream line 44 pass over the port 43 while stream lines under the stream line 44 enter the port 43. Thus the stream line 44 represents a boundary between the fluid that flows into the port 44 and that bypasses the port 43.

The ultrasonic wave generators 11 and 12 are supported and operate in substantially the same manner as described with respect to the embodiment of FIG. 1. They generate superposing wave patterns 11A and 12A in the region 13 upstream of the port 43 to form a composite wave pattern. By selecting appropriate wave lengths and an intersection angle $\alpha$ for the wave patterns 11A and 12A particulate matter in the fluid flowing through the region 13 will be diverted to the portion of the fluid flow above the stream line 44. Such particulate matter therefore bypasses the port 43.

Figure 6:
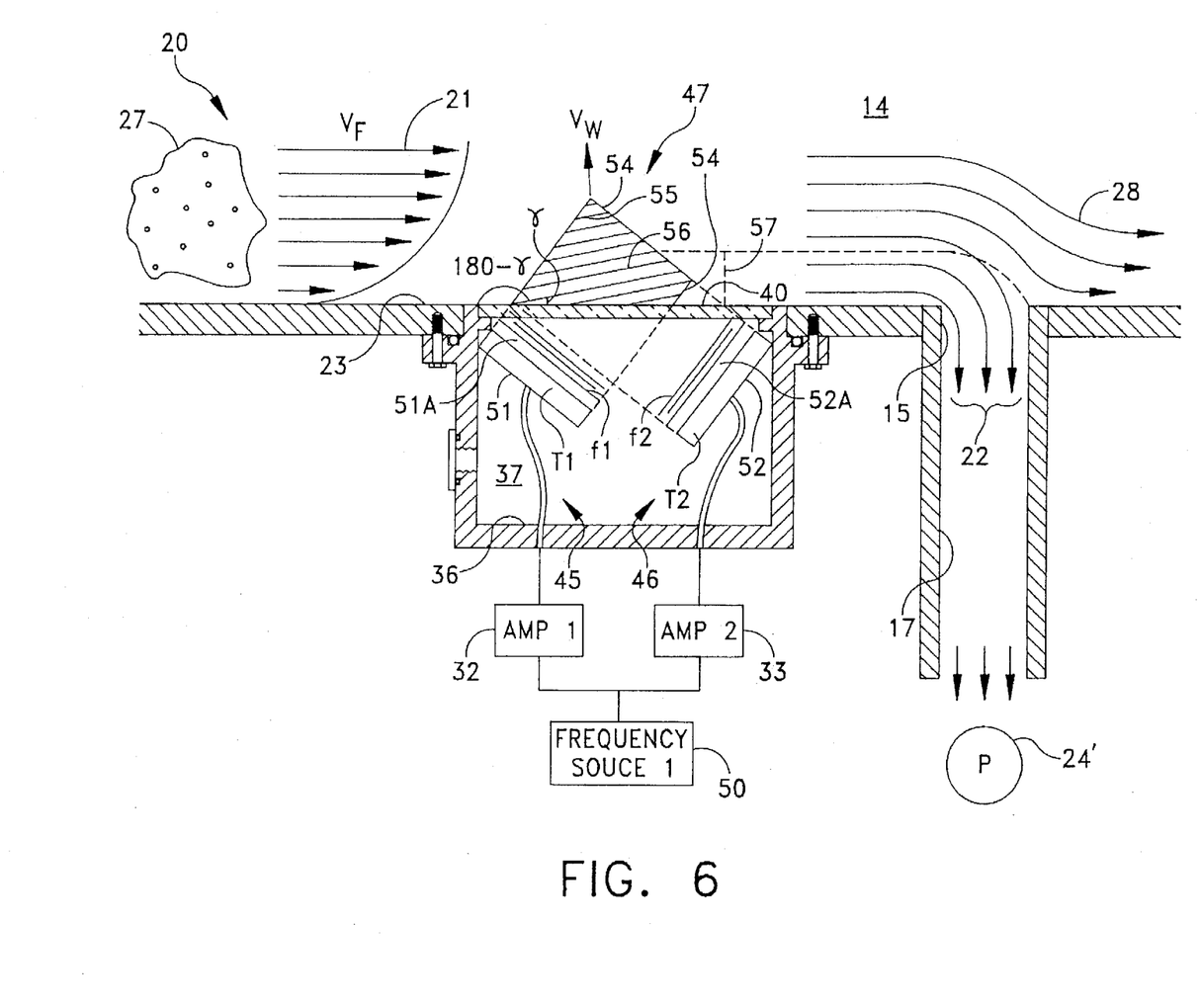
FIG. 6 is a plan view of still another embodiment of this invention.

Referring now to the embodiment in FIG. 6, ultrasonic wave generators 45 and 46 generate a superposed composite wave pattern in a region 47 in response to signals from a single, common frequency source 50 connecting through amplifiers 32 and 33 to the transducers 51 and 52. The wave patterns emanating from the transducers 51 and 52 are of the same frequency. The transducers 51 and 52 are orientated and physically located to form a composite wave pattern in the region 47 upstream from the port 15. Nodes 54 and antinodes 55 of the composite wave pattern in this instance are not moving (i.e., the composite wave pattern is a true standing wave), because the frequency of the generated wave patterns are the same. However, the relative positioning and orientation of the transducers 51 and 52 enables this apparatus to produce nodes 54 and antinodes 55 that extend at an acute angle $\gamma$ relative to the flow of the fluid body 14 and the surface 23. This is accomplished by tilting the transducers 51 and 52 with respect to the horizontal.

Entrained particulate matter entering the region 47 tends to accumulate along the nodes 54 and antinodes 55 as the gradients resist the flow of such particulate matter with the stream lines. The force on the particulate matter due to the flow of the fluid tends to urge such particulate matter upward along such nodes 54 and antinodes 55. Provided that the length of a line 56 times the sin $\gamma$ is greater than the length of line 57 ($L_{56}$ sin $\gamma$>$L_{57}$), particulate matter accumulating along the nodes 54 and antinodes. 55 will be filtered from the fluid passing into the port 15.

For example, assume that the angle $\gamma$ is 23.5° and that the stream line 21 is 5 feet above the surface 23 (i.e., L 57=5 ft). The length of the line 56 across the region 47 along the node 56 should be at least 12.5 feet (i.e., $L_{56}$ sin $\gamma$). Those skilled in the art will appreciate that as $\gamma$ increases, the extent of the region 47 decreases. However, there is a limit in the value of $\gamma$. Above that limit, particulate matter may accumulate along the nodes and antinodes but not move along the inclined flow lines. Eventually such particulate matter will "leak" through the region 47.

Figure 7:
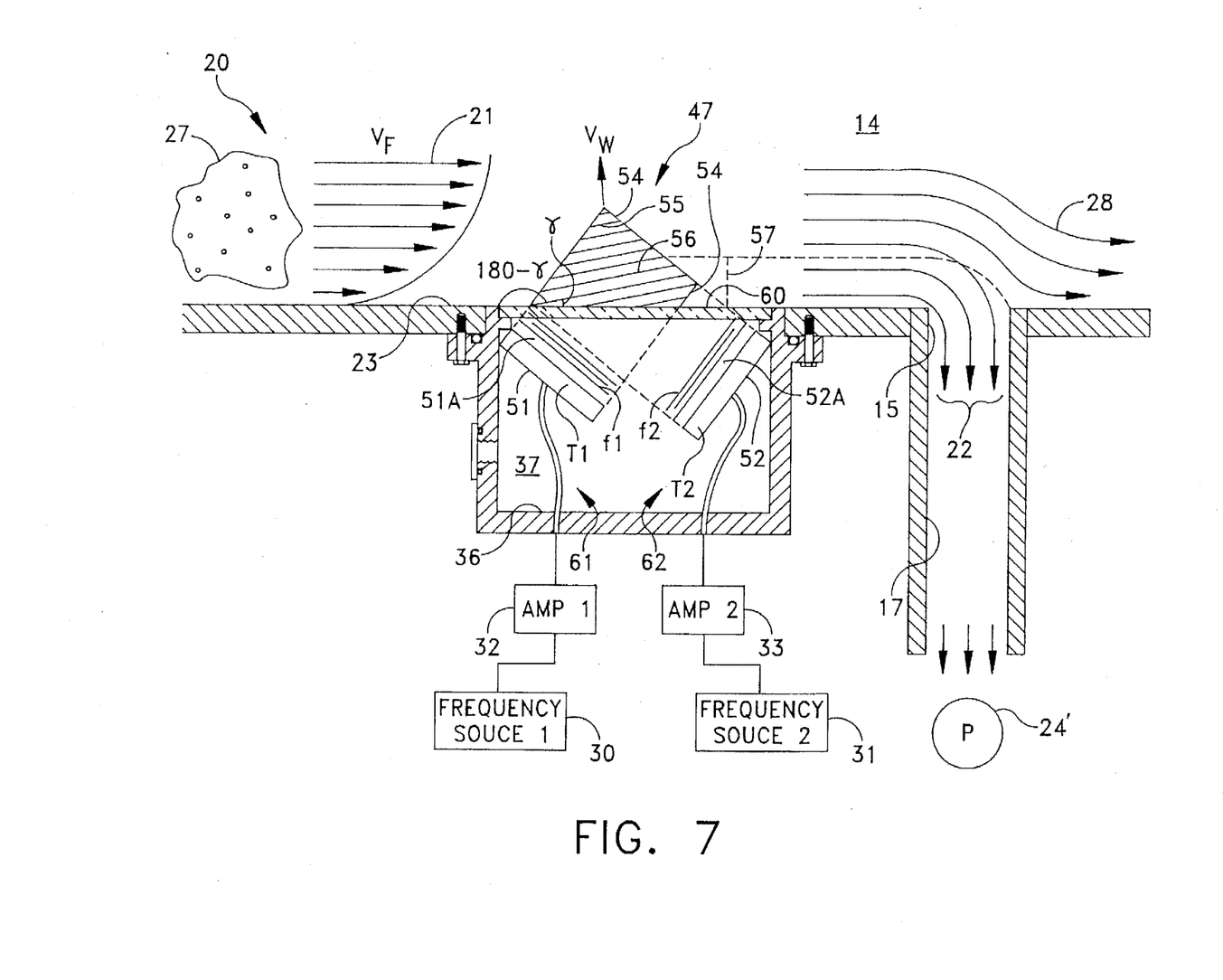
FIG. 7 is a plan view of yet another embodiment of this invention.

Yet another embodiment of this invention as illustrated in FIG. 7 comprises ultrasonic filtering apparatus 60 with ultrasonic wave generators 61 and 62 oriented as in the embodiment of FIG. 6. However, the wave generators 61 and 62 connect with the separate frequency sources 30 and 31. The frequency sources 30 and 31 operate at differential frequencies so that the nodes 54 and antinodes 55 of the composite wave pattern in the region 47 move at a velocity $V_w$. The resulting nodes 54 and antinodes 55 urge the particulate matter accumulating thereon upwardly at the velocity $V_w$.

Additionally, since the nodes 54 and antinodes 55 are included at the angle $\gamma$ the flow of the fluid body 14 urges the particulate matter upwardly along the nodes 54 and antinodes 55. Thus, when using this embodiment, the region 47 need not be as extensive in the direction of the fluid flow as with the other previously described embodiments of FIGS. 1, 5 and 6, because the particulate matter is moved out of the flow by both the force exerted by the moving nodes and antinodes of the composite wave and by the flow of the fluid urging the particulate matter along the inclined planes of the nodes and antinodes in the region 47.

Figure 8:
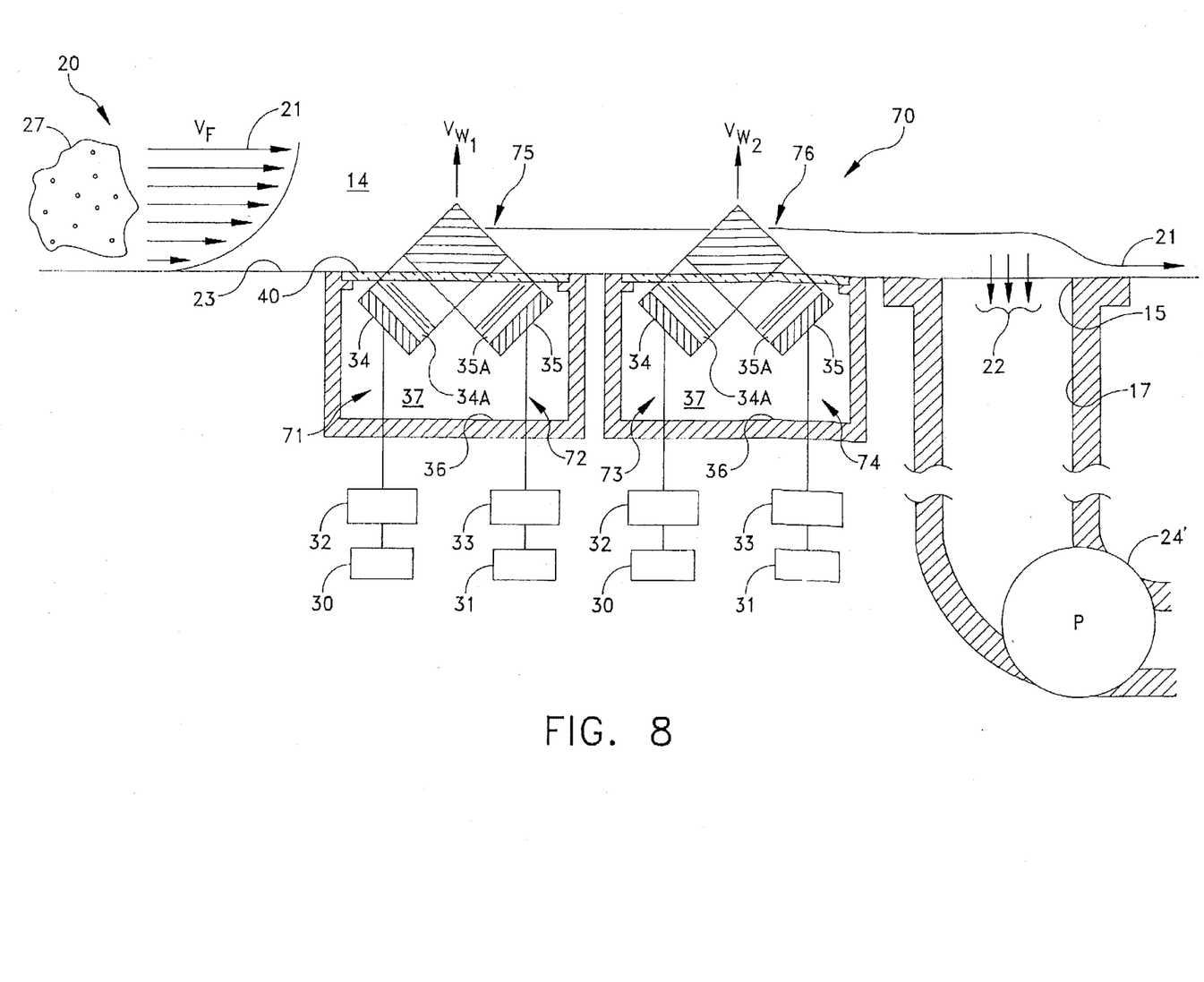
FIG. 8 is a plan view of a further embodiment of this invention.

Yet a further embodiment of this invention comprises an ultrasonic filtering apparatus 70 as depicted in FIG. 8. This apparatus includes a first set of ultrasonic wave generators 71 and 72 and a second set of ultrasonic wave generators 73 and 74, respectively. Each is positioned upstream of the port 15. The generated waves superpose in the regions 75 and 76. However, the generators 70 and 71 produce a pattern with nominal wavelengths that differ from the pattern that the generators 72 and 73 produce. Consequently, the spacing of nodes 77 and 78 in the region 75 is different from the spacing of nodes 79 and antinodes 80 in the region 76. This embodiment allows each set of generators to be customized for removing particulate matter of different sizes. For example, the first region 75 could be formed to filter smaller particulate matter, and the region 76 larger particulate matter. As a more specific example, the wave generators 71 and 72 could be set to displace 25 to 100 micron diameter particles; the wave generators 72 and 73, to displace 100 to 500 micron diameter particles. In this embodiment while each of the composite waves are depicted like the composite wave of FIG. 1, those skilled in the art will appreciate that either or both of the wave generators 71 and 72 and the wave generators 73 and 74 can produce a composite pattern in the regions 75 and 76, respectively, like the composite wave patterns disclosed by the embodiment of FIGS. 1, 6 or 7 (that is, the composite waves could include moving horizontally oriented moving nodes and antinodes, static inclined nodes and antinodes, or both).

In summary there is disclosed apparatus and methods for filtering particulate matter from a fluid that flows across a surface into a port. Ultrasonic wave generators produce ultrasonic wave patterns in the fluid that superpose in a region extending from the surface upstream of the port to form a composite wave pattern. The resulting composite wave pattern with its nodes and antinodes actively or passively transports particulate matter in the fluid away from the port. That is, the ultrasonic generating devices are oriented to form a composite wave pattern with nodes and antinodes extending at an acute angle with respect to the flow. Consequently flow through the nodes and antinodes causes the particulate matter to be transported. The generators also may operate at differential frequencies to control the velocity of the nodes and antinodes displaces the particulate matter. Systems can be constructed using both nodes and antinodes at acute angles and differential frequency generators.

In constructing the embodiments of this invention those skilled in the art will appreciate that the energy of the ultrasonic waves necessary to achieve the aims and objects of this invention will be a function of the velocity $V_F$ of the fluid, the density of particles to be moved, the area of the region of the composite wave pattern, and the like. The apparatus of this invention can thus produce the composite wave pattern to provide either active or passive interaction or a combination thereof transporting particulate matter out of the fluid entering the port. Generally a composite wave pattern exhibiting an energy level between 50 and 250 db will be sufficient. Increasing energy levels beyond a threshold value according to the characteristics of the fluid such as density or temperature, increases the effectiveness of the process. However such increases may have deleterious effects such as degassing the fluid (e.g., water) and/or causing cavitation.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A method for filtering particulate matter of a preselected size and density from fluid entering a port in a surface in which the surface and fluid undergo relative motion that establishes a flow boundary spaced from the surface and between a first fluid flow portion contiguous the surface that enters the port and a second fluid flow portion that is spaced from the surface and that bypasses the port, said method comprising the steps of:

generating first and second ultrasonic waves; and superposing the first and second ultrasonic waves in the first fluid flow portion to define a composite wave pattern in a first region of the first fluid flow portion upstream of the port such that particulate matter in the fluid passing through the region is transported to the second fluid flow portion and fluid entering the port from the first fluid flow portion is substantially free of such particulate matter.

2. A method for filtering as recited in claim 1 wherein said step of generating the first and second wave patterns generates the wave patterns with the same frequency so that said step of superposing defines the composite wave pattern with nodes and antinodes that are substantially stationary with respect to the port, said method additionally comprising positioning the ultrasonic wave generators to orient the nodes and antinodes at an acute angle relative to the flow of the fluid in the first fluid flow portion thereby to displace particulate matter into the second fluid flow portion.

3. A method for filtering as recited in claim 1 wherein the first and second ultrasonic waves are generated in the first region of the first fluid flow portion upstream of the port and said method further includes:

generating third and fourth ultrasonic waves of wavelengths different from the first and second wavelengths; and superposing the third and fourth ultrasonic waves in a second region of the first fluid flow portion upstream of the port to define a second composite wave pattern in a second region spaced from the first region and adapted to displace particulate matter of a size different from the first composite wave pattern.

4. A method for filtering as recited in claim 1 wherein said step of generating includes generating the first and second ultrasonic waves with different frequencies, said step of superposing the composite wave pattern defining nodes and antinodes that move from the surface to the second fluid flow portion.

5. A method for filtering as recited in claim 4 further comprising the step of positioning and orienting the ultrasonic wave generators so that said step of superposing defines the composite wave pattern with the nodes and antinodes oriented at an acute angle relative to the flow of the fluid in the first fluid flow portion.

6. A method for filtering as recited in claim 4 further comprising the step of positioning and orienting the ultrasonic wave generators so that said step of superposing defines the composite wave pattern with the nodes and antinodes oriented substantially parallel with the flow of the fluid in the first fluid flow portion.

7. Apparatus for removing entrained particulate matter from fluid entering a port in a surface in which the surface and fluid undergo relative motion that establishes a flow boundary between a first fluid flow portion that extends from the surface and that enters the port and a second fluid flow portion that is spaced from the surface and that bypasses the port, said apparatus comprising:

first ultrasonic wave generating means for generating first ultrasonic waves over a distance from the surface to include the first fluid flow portion; and a second ultrasonic wave generating means for generating second ultrasonic waves over a distance from the surface to include the first fluid flow portion such that the second ultrasonic waves superpose with said first ultrasonic waves to define a composite wave in a region of the fluid body upstream of the port and traversing the first fluid flow portion such that the composite wave transports particulate matter in the first fluid flow portion away from the port and into the second fluid flow portion.

8. The apparatus as recited in claim 7 wherein each of said first and second ultrasonic wave generating means includes a transducer.

9. The apparatus as recited in claim 7 wherein said first and second ultrasonic wave generating means are located in a first region of the first fluid flow portion upstream of the port, said apparatus further comprising:

a third ultrasonic wave generating means for generating third ultrasonic waves of a wavelength different from the first and second ultrasonic waves; and a fourth ultrasonic wave generating means for generating fourth ultrasonic waves that superpose with the third ultrasonic waves to define a second composite wave in a second region of the first fluid flow portion upstream of the port and spaced from the first region, the second composite wave defining means for transporting particulate matter of differing characteristics from that transported by the first composite wave away from the port and into the second fluid flow portion.

10. The apparatus as recited in claim 7 wherein said first and second ultrasonic wave generating means are disposed and oriented such that nodes and antinodes in the composite wave defined by superposing the first and second ultrasonic waves are substantially parallel with the flow in the first fluid flow portion.

11. The apparatus as recited in claim 10 wherein said first and second ultrasonic wave generating means include means for generating the first and second ultrasonic waves at differential frequencies to define the composite wave as a pseudo-standing wave with the nodes and antinodes moving substantially transverse to the flow of the fluid in the first fluid flow portion.

12. The apparatus as recited in claim 7 comprising:

wherein the surface includes an acoustically transparent section upstream of the port and said apparatus further comprises a chamber abutting the surface at the acoustically transparent section, said first and second ultrasonic wave generating means being located in said chamber.

13. The apparatus as recited in claim 12 wherein each of said first and second ultrasonic wave generating means includes a transducer positioned in said chamber.

14. The apparatus as recited in claim 7 wherein said first and second ultrasonic wave generating means are disposed and oriented to define the composite wave with nodes and antinodes extending at an acute angle relative to the flow of the fluid in the first fluid flow portion.

15. The apparatus as recited in claim 14 wherein said first and second ultrasonic wave generating means include means for generating the first and second ultrasonic waves at differential frequencies to define the composite wave as a pseudo-standing wave with the nodes and antinodes moving substantially transversely to the flow of the fluid in the first fluid flow portion and toward the second fluid flow portion.

16. The apparatus as recited in claim 14 wherein said apparatus includes means for operating said first and second ultrasonic wave generating means at the same frequency to define the composite wave as a standing wave and to transport particulate matter accumulating along the nodes and antinodes in a direction generally away from the port and into the second fluid flow portion.

* * * * *